United States Patent [19]

Schultz

[11] Patent Number: 4,975,028

[45] Date of Patent: Dec. 4, 1990

[54] PUMP APPARATUS FOR EVACUATING CONTAINERS

[76] Inventor: Glen R. Schultz, 87 Parkway Dr., Yorkville, Ill. 60560

[21] Appl. No.: 296,675

[22] Filed: Jan. 13, 1989

[51] Int. Cl.[5] .......................... F04B 37/10; F04B 39/10
[52] U.S. Cl. ..................................... 417/442; 417/503; 417/511; 417/553; 137/843
[58] Field of Search ............... 417/442, 503, 511, 553; 137/843

[56] References Cited

U.S. PATENT DOCUMENTS

| | | | |
|---|---|---|---|
| 1,051,738 | 1/1913 | Kavanagh | 137/843 |
| 3,224,378 | 12/1965 | Graham | 417/511 |
| 3,313,444 | 4/1967 | Katell | 220/231 |
| 3,337,091 | 8/1967 | Bartels | 137/843 |
| 3,994,032 | 11/1976 | Spickofsky | 417/472 |
| 4,278,114 | 7/1981 | Ruberg | 417/490 |
| 4,575,990 | 3/1986 | von Bismarck | 53/434 |
| 4,583,925 | 4/1986 | Hawkins | 417/555.1 |

Primary Examiner—Leonard E. Smith
Attorney, Agent, or Firm—Augustus G. Douvas

[57] ABSTRACT

Apparatus for evacuating a rigid container using a two-stroke reciprocating-piston pump having an air evacuating vacuum cup which is to be applied to the container lid. The pump cylinder houses a reciprocating piston-check-valve. An adhesive-tape check valve is applied to a container access opening in the lid; and the vacuum cup is seated over the adhesive-tape check valve to evacuate the rigid container. An alternative embodiment employing a vacuum probe having an in-line check valve is inserted into an otherwise plugged opening in the pump cylinder wall to evacuate a deformable container. In the second embodiment, the adhesive-type check valve is eliminated. The two check valves employed in each embodiment alternate open and closed states during piston reciprocation.

10 Claims, 2 Drawing Sheets

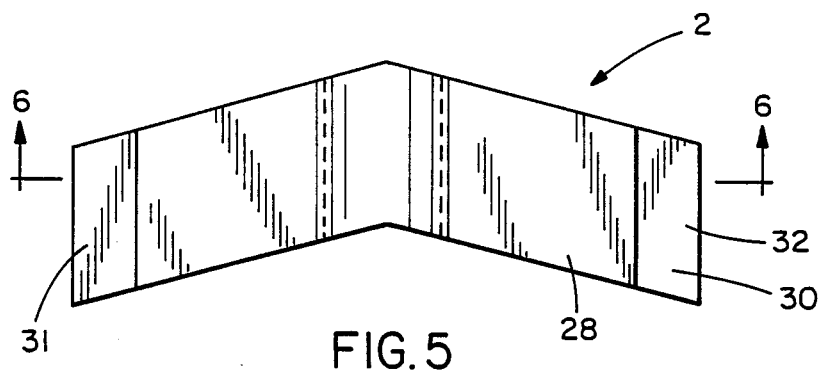
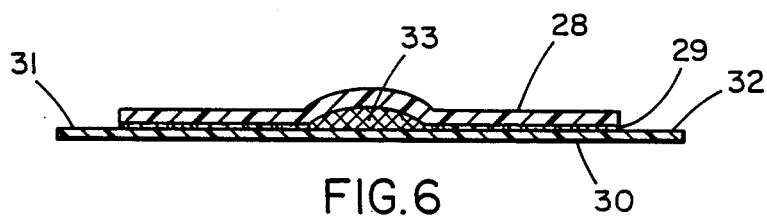
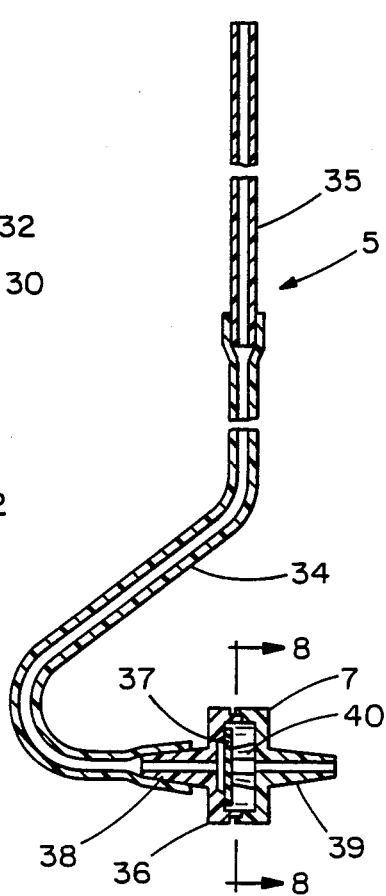
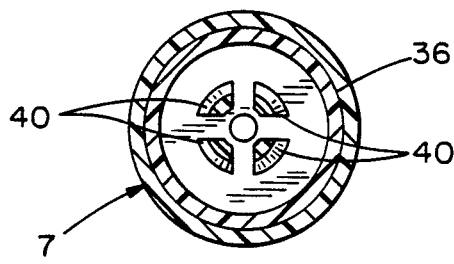
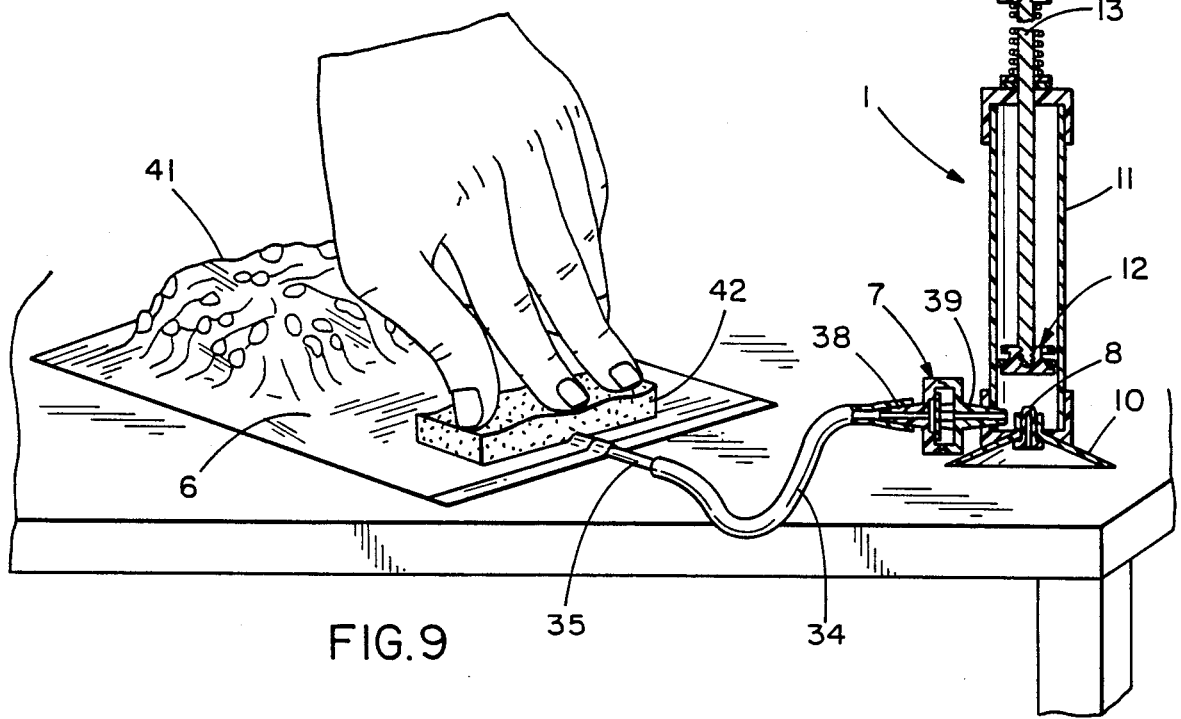

PUMP APPARATUS FOR EVACUATING CONTAINERS

This invention relates to pump apparatus for evacuating containers. The invention is particularly adapted to evacuate air from food storage containers, such as jars and plastic sacks.

BACKGROUND OF THE INVENTION

The prior art is prolific in patents that disclose various types of pumps for evacuating air from food containers. The most pertinent patents to the present invention are believed to be U.S. Pat. Nos. 3,313,444 issued April 1, 1967; 4,278,114 issued July 14, 1981; 4,575,990 issued March 18, 1986; and Swiss Pat. No. 200360 having a Veroffentlicht date of January 2, 1938.

These patents disclose pump apparatus for evacuating either rigid containers (jars) or deformable containers (plastic sacks), but not both. Additionally, the arrangements most pertinent to this invention employ complex and difficult to apply check valves to the covers (or lids) of rigid containers which are to be pump evacuated.

Accordingly, a principal object of this invention is to provide relatively simple, inexpensive and effective apparatus for evacuating both rigid and deformable containers, such as jars with lids and also plastic sacks.

Another object is to quickly, simply, and inexpensively evacuate (or reevacuate) and seal, permanently or temporarily any store-bought, throw-away, food jar and lid that was originally vacuum sealed.

SUMMARY OF THE INVENTION

The pump apparatus of this invention consists of three principal components; in particular, (1) a specially designed disposable/reuseable, pressure-sensitive, adhesive-tape check valve that adheres to a container lid and covers a small air evacuating hole, (2) a reciprocating two-stroke piston pump that features an efficient piston-check-valve and a vacuum cup which cooperates with plugable porting to provide for evacuation of both rigid and deformable containers, and (3) an accessory probe which is plugged into the pump to evacuate deformable containers such as plastic sacks.

With the pump apparatus of this invention, a jar can be reused to store anything that will fit and which will keep better in a vacuum. The apparatus also pulls a vacuum on an ordinary plastic zipper-lock type bag and allows the zipper to be closed without loosing the vacuum. The apparatus will also evacuate any leak proof bag that might be sealed with a commercial home-style hot-sealing machine.

The advantages of the invention are manyfold. The pump apparatus weights less than a pound, is simple to operate, is easy to disassemble and reassemble (no tools required) for cleaning or storage, has only one moving part, pulls a high vacuum, (more than 27 inches mercury), is portable, and is not messy or dirty.

BRIEF DESCRIPTION OF THE DRAWINGS

In order that all of the structural features for attaining the objects of this invention may be understood, reference is made to the accompanying drawings wherein:

FIG. 5 is a plan view of the adhesive-tape check valve with its peel-off, throw-away backing attached to protect the adhesive layer and the elastomer pad of the valve;

FIG. 6 is a section view taken along line 6—6 of FIG. 5 which shows the several layers of the adhesive-tape check valve and the encapsulated elastomer pad;

FIG. 7 is an elevation view in section of an optional probe specially designed to evacuate plastic bags;

FIG. 8 is a section view taken along line 8—8 of FIG. 7 which shows the internal construction of the check valve used in the probe of FIG. 7; and FIG. 9 is a view in-part perspective and in-part in section showing the application of the pump with the probe of FIGS. 7 & 8 to a plastic sack containing material to be preserved.

DETAILED DESCRIPTION OF THE PREFERRED EMBODIMENT

Figure 1:
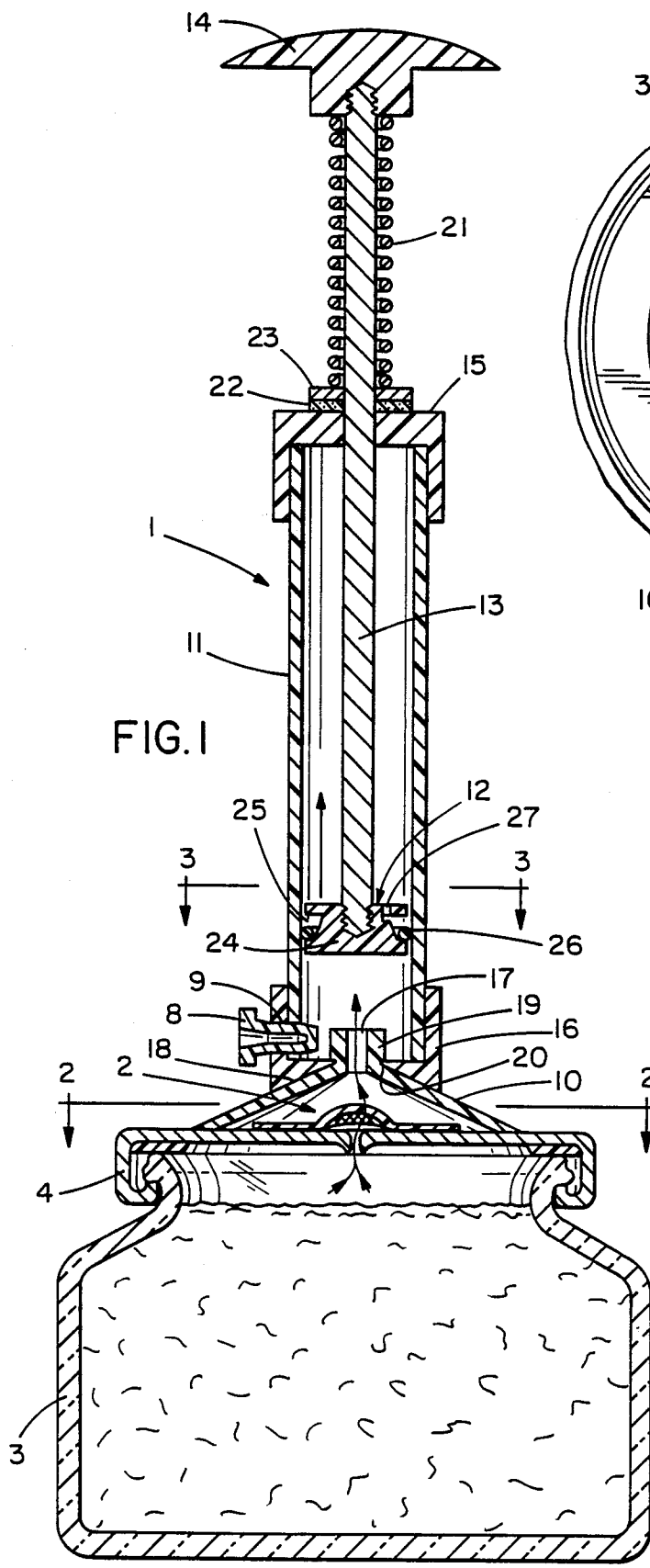
FIG. 1 is an elevation view in section of the pump apparatus of this invention during a piston up-stroke applied to the lid of a container (food jar) to evacuate air from the inner container cavity which holds the material (food) to be preserved.
Figure 2:
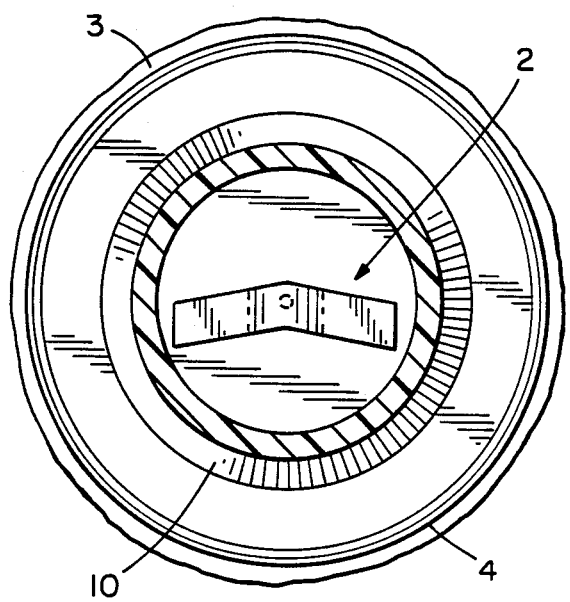
FIG. 2 is a section view taken along line 2—2 of FIG. 1 which shows a plan view of a specially designed disposable/reusable, pressure-sensitive, adhesive-tape check valve applied to the container of FIG. 1.

Referring to the drawings, the principal components of a first embodiment of the invention (FIG. 1) comprises piston pump 1 and adhesive-tape check valve 2 (FIGS. 5 & 6). This first embodiment is particularly adapted to evacuate rigid containers, such as jar 3, by applying check valve 2 over a small hole punched in lid 4 of jar 3.

An optional second embodiment of the invention (FIG. 9) employes pump 1 in association with probe 5 (FIG. 7) to evacuate a non-rigid container, such as plastic sack 6. In the second embodiment, adhesive-tape check valve 2 is not used, and an in-line check valve 7 (FIGS. 7 & 8) having a rigid housing is inserted in the air line of probe 5.

In the first embodiment, plug 8 is inserted in side port 9 (FIG. 1) to block a side inlet; however, in the second embodiment plug 8 is removed from the side port 9, and check valve 7 end of probe 5 is inserted in side port 9. Plug 8 is inserted in the throat of vacuum cup 10 (FIG. 9) to block any possible passage of air through the vacuum cup and to convert the vacuum cup into a suction cup so that the pump assembly can be affixed to a table.

Piston pump 1 is used in both embodiments without any change in structure. In particular, the pump consists of a 1¾ inch diameter vacuum cup 10 fabricated from a flexible soft plastic and is fixed to one end of plastic tube 11. Tube 11 defines a pump cylinder the bore of which houses a uniquely designed 0-ring piston-check-valve 12. The piston-check-valve is connected to one end of a spring-loaded, metal or plastic rod 13; and a manually actuatable push-pull knob 14 is fixed to the other rod end to reciprocate the piston-check-valve to effect air evacuation. Rod 13 need not be spring loaded when evacuating a jar.

In a preferred embodiment, pump 1 is approximately 14 inches long when assembled for use. Tube 11 is approximately 6 inches long and it has a ⅝ inch outside diameter. For shipment, cleaning and storage, the pump may be broken down to about 9 inches with one simple jerking motion which separates top end cap 15 from cylinder 11. Alternately, the pump assembly may be conveniently stored in a broom clip on a wall or cabinet door.

Bottom end cap 16 couples vacuum cup 10 to the lower end of tube 11. Side port 9 extends through both tube 11 and bottom end cap 16. Plug 8 is inserted in port 9 when air is to be evacuated from jar 3 through the central passage formed by throat 17 of vacuum cup 10, as is shown in FIG. 1. Tube 11 and end caps 15 and 16 are preferably formed of rigid shatter resistant CPVC plastic. The tube and end caps could also be fabricated of glass or metal.

An inwardly projecting annular lip 18, which defines a centrally located hole, is integrally formed on the lower portion of bottom end cap 16. Neck 19 of vacuum cup 10 is formed with an annular recess 20 which engages lip 18 when neck 19 is press fit through the hole formed by lip 18. The special shape of the bottom end cap defines a small Chamber into which adhesive-tape check valve 2 can move up and down. Without this chamber vacuum cup 10 would be sucked flat by the pumping action, thereby ultimately defeating the operation of adhesive-tape check valve 2.

Top end cap 15 is formed with a central hole to enable spring-loaded rod 13 to reciprocate within the cylinder cavity defined by tube 11. Knob 14 is threaded onto the upper end of the rod. Helical return spring 21 envelopes rod 13 between knob 14 and top end cap 15. The return spring is sized for easy operation and to supply sufficient force to provide adequate vacuum with a reaonable number of strokes, and to withstand many operations.

Spring 21 and rod 13 are continuously lubricated by an oil saturated felt washer 22 sandwiched between a flat steel washer 23 and top end cap 15. Return spring 21 keeps washer 22 in permanent compression so as to fit tightly around rod 13.

Figure 3:
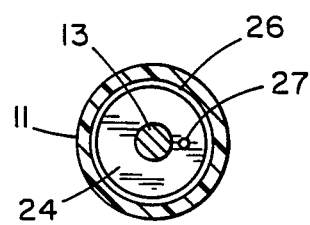
FIG. 3 is a section view taken along line 3—3 of FIG. 1 which shows the vent hole for the pump piston.

Body 24 of piston-check-valve 12 is fabricated from a machined or molded plastic, metal, or ceramic. The outer periphery of piston body 24 is formed with an annular groove 25. This groove width is oversized relative to the cross-section of its contained O-ring 26, and the groove diameter is tapered and small at one end relative to the inside diameter of its contained O-ring, in order to provide proper pumping action which requires movement of the O-ring within the groove. A small piston vent hole 27 (FIG. 3) or notch provides an air passage from groove 25 through the upper portion of body 24.

Body 24 is sized diameterwise so as to have a loose fit relative the inner cylinder wall Of tube 11. Air flows between body 24 and tube 11 unless this passage is blocked by O-ring 26.

Figure 4:
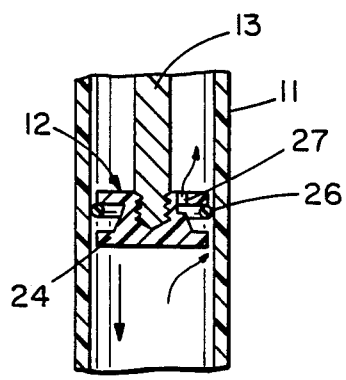
FIG. 4 is a fragmentary section view of the pump piston during a piston down-stroke.

Piston-check-valve 12 is open during the downstroke (FIG. 4). In particular, during the piston downstroke, O-ring 26 is forced upwardly against the top of oversized groove 25 by friction engagement with the cylinder wall. Accordingly, air flows around the periphery of the lower portion of piston body 24 into groove 25 below O-ring 26, and ultimately through piston vent hole 27 into the upper cylinder cavity.

Piston-check-valve 12 is closed during the up-stroke (FIG. 1). In particular, during the piston up-stroke, O-ring 26 is forced downwardly against the bottom of oversized groove 25 by friction engagement with the cylinder wall. This action closes off the air passage otherwise appearing between the loose fitting piston body 24 and the adjacent cylinder wall. During the piston up-stroke, air confined in the cylinder Cavity located above body 24 is forCed out of pump 1 by a venting passage formed between rod 13 and top end cap 15.

During the piston up-stroke, adhesive-tape check valve 2 is open, as is shown in FIG. 1, thereby evacuating jar 3 of air. Conversely, during the piston down stroke, check valve 2 is closed.

Adhesive-tape check valve 2 (FIGS. 5 & 6) may be rectangular or chevron shaped in the preferred embodiment shown in the drawings. Either configuration facilitates reciprocating action which is necessary for a reliable check-valve action. The point of the chevron shaped valve may be preferred by some for easy removal of the valve or release of the vacuum.

Adhesive-tape check valve 2 is formed with a tape layer 28 which is coated with an adhesive layer 29. The adhesive-tape is supported on a throw-away, peel-off backing 30 whose ends 31 and 32 extend beyond layers 28 and 29.

An elastomer pad 33 which serves as a valve seat is captured in the central portion of tape layer 28 between adhesive layer 29 and backing 30. A preferred sealing material is a low durometer (about 30, Shore A) FDA elastomer pad of approximately $0.31 \times 0.31 \times 0.020$ inch which is bonded to the adhesive layer of the tape. The tape and sealing material that make up valve 2 can be reused many times.

The actual construction of valve 2 is accomplished by running a roll of vinyl adhesive-tape partially around a roller having a groove. The non-sticky side is in contact with the roller. The tape is manipulated so it conforms to the groove in the roller. Another roller in close proximity to the first has a roll of backing material partially wrapped around it. The backing is about 15 inches wide and the vinyl tape is 1.0 inches wide. The two tapes are roll pressed together. The void created by the groove in the first roller is filled with an FDA (food grade) uncured silicone rubber that is injected into the void just at the pinch line of the two rolls. After the silicone rubber cures the valves are die-cut through the vinyl tape and silicone rubber but not through the backing. The valves are then distributed in lengths containing 25 to 50 valves per length.

In preparation for evacuating resealable jar 3, a small hole is punched in lid 4 near the center of the lid. Check valve 2 is placed (with peel-off backing 30 removed) with elastomer sealing pad 33 covering the small hole. During operation. vacuum cup 10 is placed on lid 4 over valve 2 (FIG. 1). As knob 14, rod 13, and piston-check-valve 12 are pushed down, piston-check-valve 12 is opened and adhesive-tape Check valve 2 is closed. As spring 21 returns piston-check-valve 12 and rod 13 to its extended position, piston-check-valve 12 is closed and adhesive-tape check valve 2 is opened and air is drawn from jar 3 by the vacuum created by piston pump 1. The knob may also be pulled up manually if the spring is not used. The spring tension and piston diameter are designed to cause a vacuum, in the range of 25 to 27 inches of mercury, to be attainable.

Repeated reciprocations are made until jar 3 is adequately evacuated, which is noted by only a partial return of the knob 14 and rod 13 assembly to its fully extended position, or by the feel of a tightly adhered vacuum cup to the jar lid. This feeling of tightness can be compared when pump 1 is sucked tight to that of a smooth flat surface with no hole or other leaks. The number of reciprocations required for adequate evacuation varies with the volume of air in the jar. Maximum vacuum may be reached with as few as two reciprocations.

After jar 3 has been adequately evacuated, pump 1 is removed with adhesive-tape check-valve 2 remaining in place. When one desires to open jar 3, all that is necessary to release the vacuum, is simply to lift the sealing pad portion of valve 2 only far enough to uncover a portion of the hole in lid 4. After the hissing noise stops, the vacuum has been released and the jar may be more easily opened.

Contrary to the belief of some, nearly all of the vacuum sealed "throw-away" jars on the market today may be permanently resealed. Furthermore, by using pump 1 of this invention, the same jar, lid, and adhesive-tape check-valve 2 may be resealed many times. And, since adhesive-tape Check-valve 2 is itself reuseable, it may be transferred to another jar lid.

Additionally, using pump 1 of this invention, allows any store bought sealed jar to be easily opened, even by people with small and/or arthritic hands. Punching the hole in the jar lid, releases the vacuum that initially caused the jar to open with difficulty. After releasing the vacuum the hole may be covered with the adhesive-tape check valve in preparation for resealing.

The second embodiment of this invention shown in FIGS. 7, 8 and 9 employs an accessory kit which forms probe 5. Probe 5 is employed to evacuate non-rigid containers, such as plastic sacks (FIG. 9). Probe 5 (FIG. 8) comprises a central section of an FDA approved flexible plastic tubing 34, a straight length of FDA approved rigid plastic tubing 35 inserted into the first end of tubing 34, and an in-line check valve 7 inserted into the other end of plastic tubing 34.

In-line check valve 7 is formed with a plastic housing body 36 that defines an internal cavity that contains a flexible valve seat disc 37 formed from FDA approved material. The periphery of the disc flexes to open and close the valve. Access to this internal cavity is obtained through apertured inlet nipple 38 and through apertured outlet nipple 39. Stop 40 limits the movement of valve seat disc 37 within housing body 36.

When probe 5 is used, the free end of rigid tubing 35 is inserted into the open end of sack 41 (FIG. 9). A foam block 42 is preferably manually employed to hold tubing 35 in place and to keep the sack sealed around tube 35 during evacuation.

Plug 8 is removed from side port 9 (the position shown in FIG. 1), and reinserted into central throat 17 of vacuum cup 10 (the position shown in FIG. 9). Outlet nipple 39 is inserted into port 9, and manual pumping is started as described with respect to the first embodiment of FIG. 1. The periphery of valve seat disc 37 flexes within the cavity of housing body 36. During the down-stroke, disc 37 closes inlet nipple 38; and during the up-stroke, disc 37 flexes against stop 40 thereby opening the check valve to permit air evcuation as previously described with respect to jar 3. When sack 6 has been adequately evacuated, probe 5 is removed from the sack, and the sack clamped closed by conventional means. The seal of the bag may be enhanced by coating the inner walls at the sealing area with vegetable oil, butter, or margerine.

It should be understood that the above described arrangements are merely illustrative of the principles of this invention. Modification can be made without departing from the scope of the invention.

What is claimed is:

1. Apparatus for evacuating a container comprising a two-stroke reciprocating-piston pump having a flexible, air-evacuating vacuum cup which is to be applied to an access opening to the container, a piston-check-valve for the pump having a piston body and a check-valve supported by the piston body, a flexible valve to be applied to the access opening so as to cover the access opening with one of the check valves being open and the other closed during a first stroke of the piston when the vacuum cup is seated on the container in communication with the flexible check valve, and with both check valves alternating open-closed states during the second stroke of the piston to thereby evacuate the container, and means restraining the vacuum cup from collapsing upon the flexible check valve which collapse would cause the flexible check valve to close the access opening during both strokes of the piston thereby preventing substantial evacuation of the container.

2. The combination of claim 1 in which the restraining means is an end cap fixed to the pump with the end cap receiving a central portion of the vacuum cup having an air-evacuating throat with the end cap restraining flexing of the central portion and allowing flexing of a peripheral portion of the vacuum cup.

3. Apparatus for evacuating as desired either a deformable container or a rigid container supporting a flexible check valve applied to an access opening in the rigid container, comprising a two-stroke reciprocating-piston pump having a piston formed with a piston-check-valve reciprocating in a pump cylinder having an evacuating chamber defined by the piston and the cylinder, a flexible vacuum cup fixed to the pump cylinder so as to communicate with the evacuating chamber with the vacuum cup being formed with a plugable throat for exhausting the rigid container when the vacuum cup is seated over the flexible check valve applied to the rigid container and with the throat being open, and a plugable gas evacuating port for a deformable container communicating with the evacuating chamber for evacuating a deformable container through the port when open, and the port being plugged when a rigid container is being evacuated through an open throat.

4. The combination of claim 3 in which the piston-check-valve and the flexible check valve alternate between open-closed states during evacuation of the rigid container with one valve being open when the other is closed.

5. The combination of claim 4 comprising an accessory gas evacuating probe insertable into the plugable gas evacuation port to evacuate a deformable container communicating with the probe.

6. The combination of claim 5 in which the probe includes a tube insertable into a deformable container, an in-line check valve communicating with the tube, and in which the piston-check-valve and the in-line check valve alternate between open-closed states during evacuation of the deformable container with one valve being open when the other is closed.

7. Apparatus for evacuating a container of gas comprising a flexible adhesive-tape check valve to be applied to an access opening for the container with the adhesive-tape check valve alternately opening and closing during a pumping operation to evacuate the container of gas; a two-stroke reciprocating piston pump having a cylinder and a piston reciprocating within the cylinder, and a piston check valve including an O-ring positioned within an oversized annular groove formed on the outer periphery of the piston adjacent the wall of the cylinder, and in which the piston is formed with a vent which exhausts the annular groove and the pump during a piston stroke in which the adhesive-tape check valve is closed and with both check valves alternating open-closed states during the other stroke of the piston; and a gas evacuating vacuum cup which is to be applied to the container over a least part of the flexible check valve, with the vacuum cup being formed with a plugable throat for exhausting the cup, and with the cylinder being formed with a plugable gas access port located between the piston and the vacuum cup.

8. The combination of claim 7 comprising a plug inserted in the gas access port when the adhesive-tape check valve is employed to evacuate a rigid container.

9. The combination of claim 7 comprising a plug inserted in the throat of the vacuum cup, and an accessory gas evacuating probe inserted in the gas access port to evacuate a deformable container.

10. The combination of claim 9 in which the probe includes a tube insertable into a deformable container, an in-line check valve communicating with the tube, and in which the piston associated check valve and the in-line check valve alternate open-closed states during evacuation of the deformable container.

* * * * *